(12) United States Patent
Zori Garcia

(10) Patent No.: US 7,297,259 B2
(45) Date of Patent: Nov. 20, 2007

(54) OIL SPILL COLLECTION DEVICE

(76) Inventor: Tomas Zori Garcia, Salvia 36 (Urbanizacion la Moraleja), E-28109 Alcobendas (ES)

( * ) Notice: Subject to any disclaimer, the term of this patent is extended or adjusted under 35 U.S.C. 154(b) by 51 days.

(21) Appl. No.: 10/542,469

(22) PCT Filed: Jan. 9, 2004

(86) PCT No.: PCT/ES2004/000005

§ 371 (c)(1),
(2), (4) Date: Jan. 5, 2006

(87) PCT Pub. No.: WO2004/063473

PCT Pub. Date: Jul. 29, 2004

(65) Prior Publication Data

US 2006/0201867 A1    Sep. 14, 2006

(30) Foreign Application Priority Data

Jan. 15, 2003 (ES) ................................ 200300087
Dec. 30, 2003 (ES) ................................ 200303077

(51) Int. Cl.
*E02B 15/04* (2006.01)
(52) U.S. Cl. .................... 210/242.3; 210/923
(58) Field of Classification Search ........... 210/170.11, 210/242.1, 242.3, 776, 923, 523, 540
See application file for complete search history.

(56) References Cited

U.S. PATENT DOCUMENTS 3,618,768 A    11/1971    Brown
3,701,430 A *  10/1972   Tuttle ..................... 210/242.3
4,014,795 A *   3/1977   in'tVeld .................... 210/923
4,085,049 A     4/1978   Hartwick et al.
4,325,826 A *   4/1982   van Waveren et al. ...... 210/776
4,976,855 A *  12/1990   Virtanen .................. 210/242.3
4,978,448 A *  12/1990   Terokomos ............. 210/242.3
5,118,413 A     6/1992   Hagenes
5,472,597 A *  12/1995   Carro ..................... 210/242.3
5,824,231 A *  10/1998   Blomberg ................ 210/242.3
6,063,274 A     5/2000   Rivera

FOREIGN PATENT DOCUMENTS

| CA | 1042818 | 11/1978 |
|----|---------|---------|
| FR | 2812674 | 2/2002  |
| NL | 7705258 | 11/1978 |

* cited by examiner

*Primary Examiner*—Christopher Upton
(74) *Attorney, Agent, or Firm*—Michael J. Striker

(57) ABSTRACT

A device for cleaning up oil spills attachable to a ship for cleaning up crude, has a pair of arms coupleable to a side of a hull of the ship at a water line level, each of the arms having a casing with a substantial semi-circular configuration, and an open top, and a front edge extending into a baffle positioned downwards and forwards to facilitate access to floating crude into the casing, a containment partition projecting upwardly forwardly with a sufficient height to prevent the crude from rising above each of the arms, a screw housed in the casing and with its movement causing the crude to move, a collection tank arranged on an end of each of the arms and into which the crude is caused to move by the screw, the collection tank being connectable to the hull of the ship from where the crude is aspirated toward an inside of the ship.

8 Claims, 9 Drawing Sheets

OIL SPILL COLLECTION DEVICE

CROSS-REFERENCE TO A RELATED APPLICATION

The invention described and claimed hereinbelow is also described in Spanish Patent Applications DE P 2003 00087 filed on Jan. 15, 2003 and P2003 03077 filed on Dec. 30, 2003.

BACKGROUND OF THE INVENTION

The drawbacks resulting from oil spills in the sea caused by accidents of oil tankers carrying these products, and especially the negative effects that such spills imply from an ecological point of view, are very well known.

To clean up said spills and within the multiple existing possibilities, the most effective ones are obviously those which allow cleaning up the crude before it reaches the coasts, preferably in the same area in which the spill has occurred.

Suction equipment is currently used which, duly arranged on a ship, absorbs the crude from the sea and deposits it in tanks or containers of the ship.

The main drawback of this solution is based on its poor performance since there are pipes participating in said suction pumps that are suitably placed over the sea water, pipes which, in order to be duly effective, must be provided with means that bring the crude close to its suction inlet, means which currently do not exist, implying that the suction equipment absorbs more water than crude, which implies poorer performance in crude absorption, which is of the most interest, as well as requiring complementary operations to eliminate water which has been absorbed with the crude.

SUMMARY OF THE INVENTION

Maintaining the functional philosophy of lifting crude from sea level to the inside of a ship with the aid of suction equipment, the device proposed by the invention resolves in a fully satisfactory manner the drawbacks set forth above, allowing massive movement of the crude towards the crude suction area or areas.

To that end and more specifically, the device of the invention is materialized in a pair of arms intended for being fixed to the hull of the ship on either side, close to the bow, preferably in a notable intermediate position along the border, and in any case at the level of its waterline, each one of which is materialized in a frontally open casing inside which there is a screw making contact with the crude and, being duly motorized, causes the crude to be moved towards the end of the arm closest to the ship where there is a collection tank in which both the drive transmission means for the screw and the suction pipe of the corresponding pump are arranged, which deposit, as with the remaining accessories converging therein, will be provided with height adjustment means with respect to the hull of the ship in order to maintain its correct position at all times with respect to the waterline, especially as the waterline drops due to the effect of progressive loading of the ship.

Said casing has a front baffle positioned forwards and downwards so as to favor crude penetration towards the screw work area, and it in turn has a wide top rear projection of sufficient height so as to prevent the crude from passing over it in the normal mobilization thereof on the surface of the water.

For simplicity in manufacture, said casing will adopt a modular structure and will be duly stiffened by means of bottom rear brackets or ribs which also aid the front baffle and the top rear projection, said brackets being interspersed with bottom floats offsetting the weight of the arm as a whole, so that the arm is maintained afloat.

Each arm will swivel on an imaginary horizontal axis in order to be able to adopt a vertical positioning in an inoperative and transporting situation, while at the same time it will be finished on its free end with a float, with which the working level of the device will be controlled.

It has also been provided that the arms have a certain forward tilt so as to favor displacing the crude towards the cleanup area, and that arranged between its free end and the bow of the ship there is a cable or tie absorbing the stress the arm will be subjected to during the normal course of its work, which cables can be routed to any other suitable point of the hull and can be aided by other intermediate cables for the purpose of eliminating possible stresses tending to make said arms and, accordingly, the screws housed therein, buckle.

Also due to manufacturing simplicity, it has been provided that each screw adopts a modular structure based on a plurality of modules of suitable length, the shafts of which are coupled together by tongue and groove so as to allow transmitting motion, and that the strengthening brackets of the casing, specifically those located between modules of the screw, have extensions for supporting the shaft of said screw.

It has also been provided that two distinguished compartments are arranged in each collection tank and that it is in these compartments where the pumps are located both for lifting the cleaned up spills and for emptying the water which may have been carried towards said collection tanks.

It has also been provided that, for auto-adjusting the height of the collection tanks and their corresponding arms to adapt to the ship waterline, each side plate to which the corresponding collection tank is hingedly connected incorporates, in correspondence with its side areas and on its side for being fitted to the hull, respective restricted opening grooves, for example of a dovetail profile, and it has been provided that arranged on the hull of the ship there are respective suitably spaced, parallel and vertical guides, each one provided with a longitudinal male member, complementary to said grooves, with the special particularity that these members further have considerable width for the purpose of preventing possible rocking tendencies, which guides can optionally be provided with rolling means facilitating movement of the corresponding plate.

DESCRIPTION OF THE DRAWINGS

To complement the description being made and for the purpose of aiding to better understand the features of the invention, according to a preferred practical embodiment thereof, a set of drawings is attached as an integral part of said description, in which the following is shown with an illustrative and non-limiting character:

DESCRIPTION OF THE PREFERRED EMBODIMENTS

Figure 1:
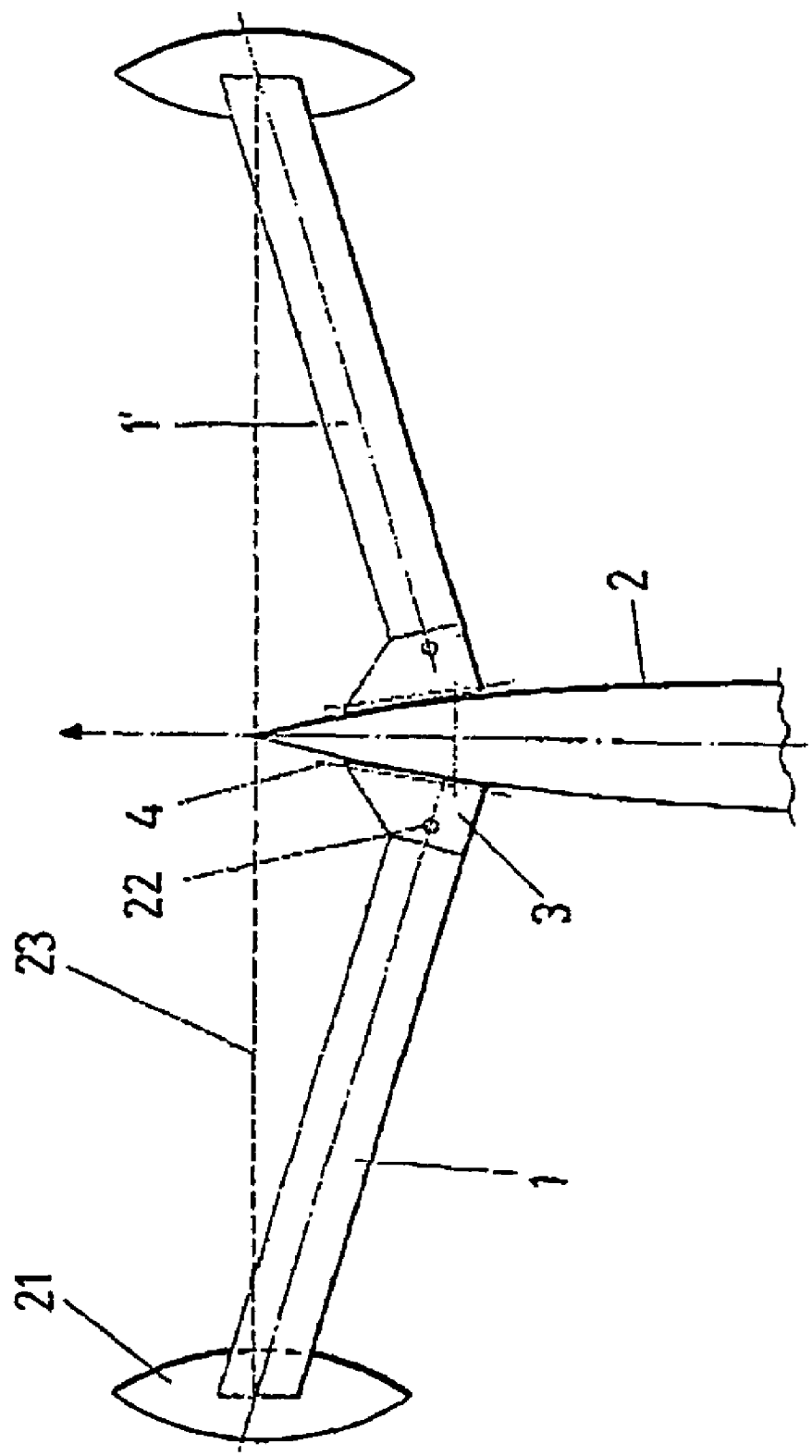

FIG. 1 shows a plan view of a schematic representation of a device for cleaning up oil spills, carried out according to the object of the present invention, duly coupled to the hull of a ship.

Figure 2:
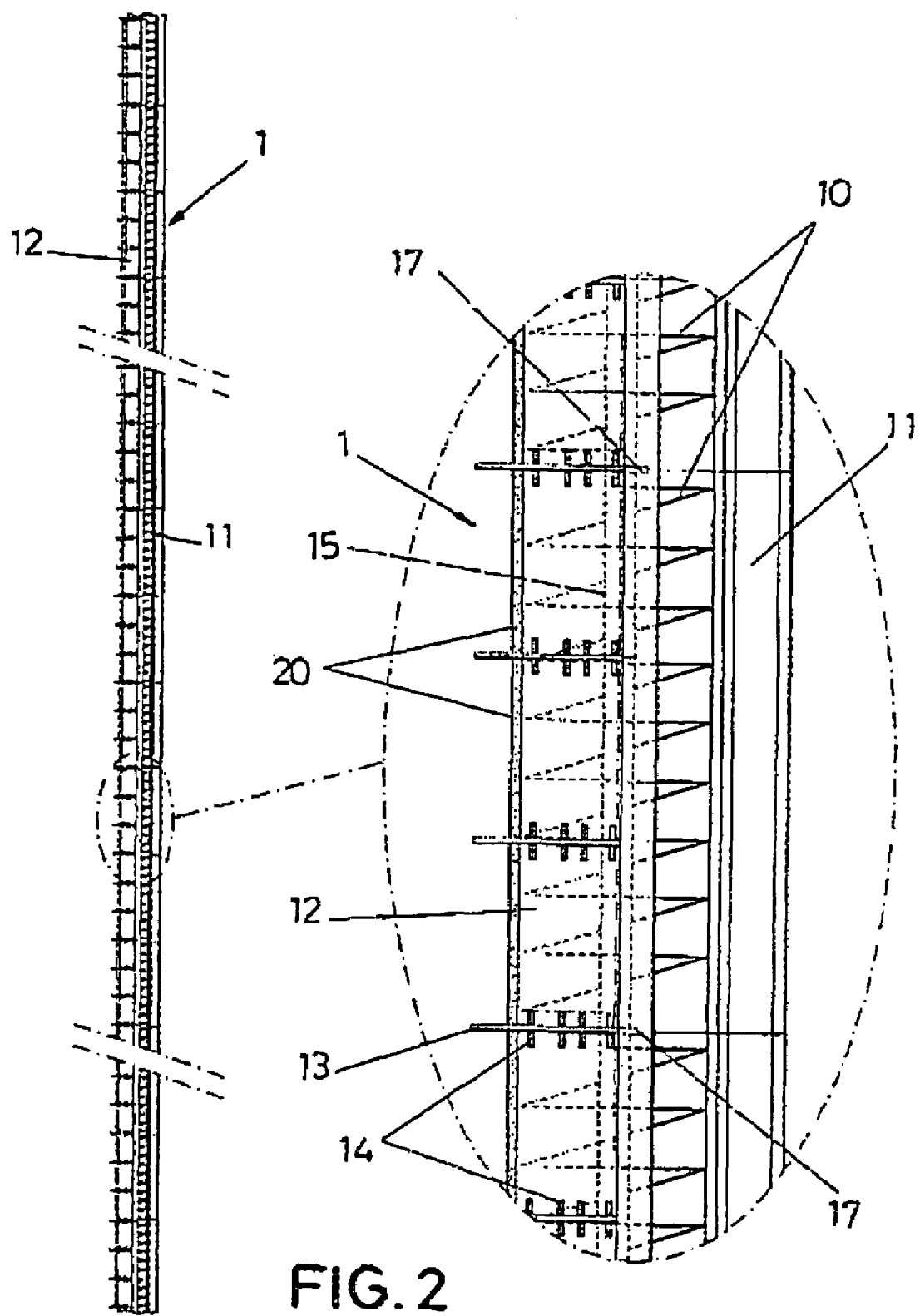

FIG. 2 shows a more detailed plan view of one of the two arms collaborating in said device.

Figure 3:
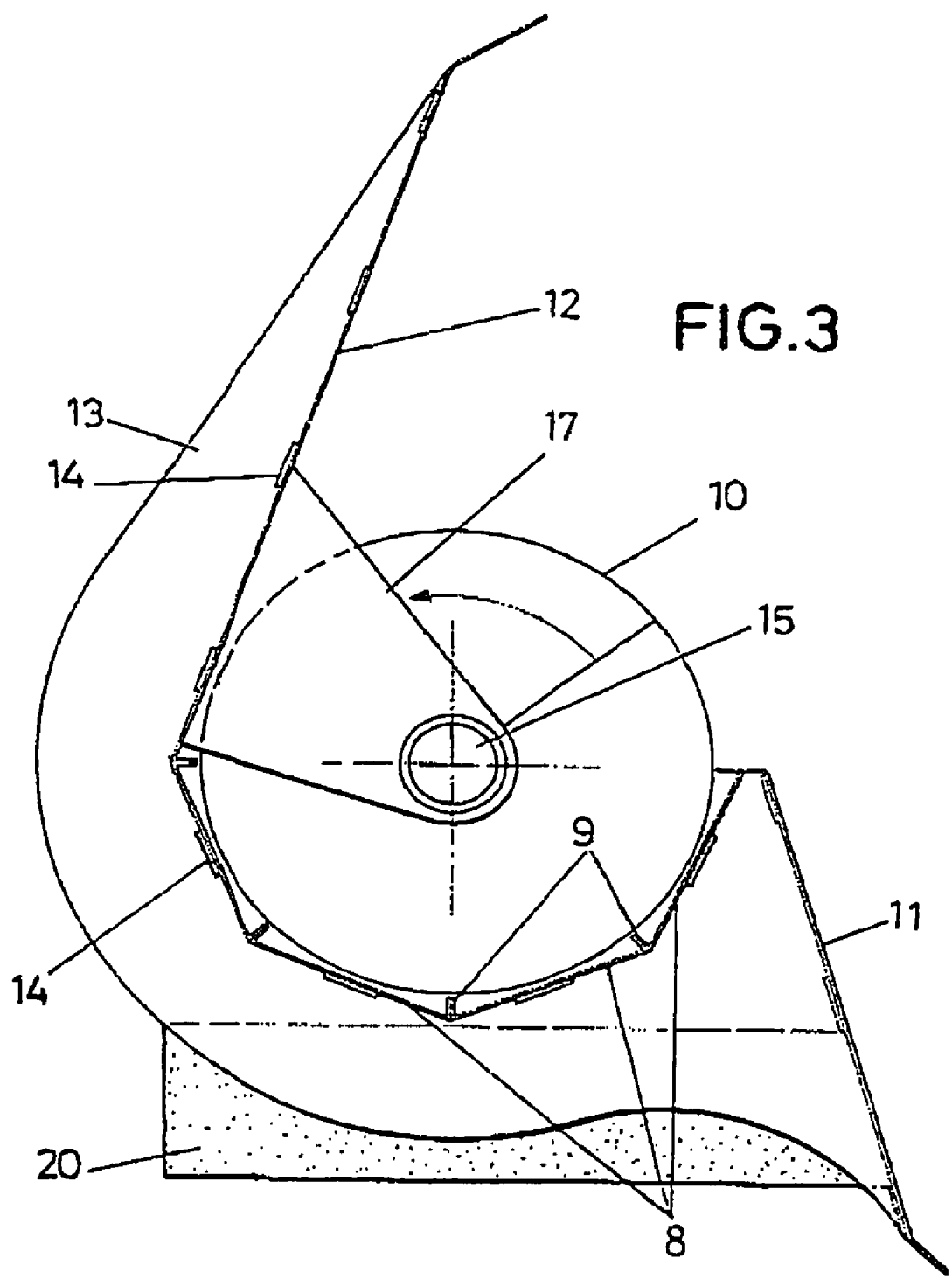

FIG. 3 shows a cross sectional view of a detail of one of the arms.

Figure 4:
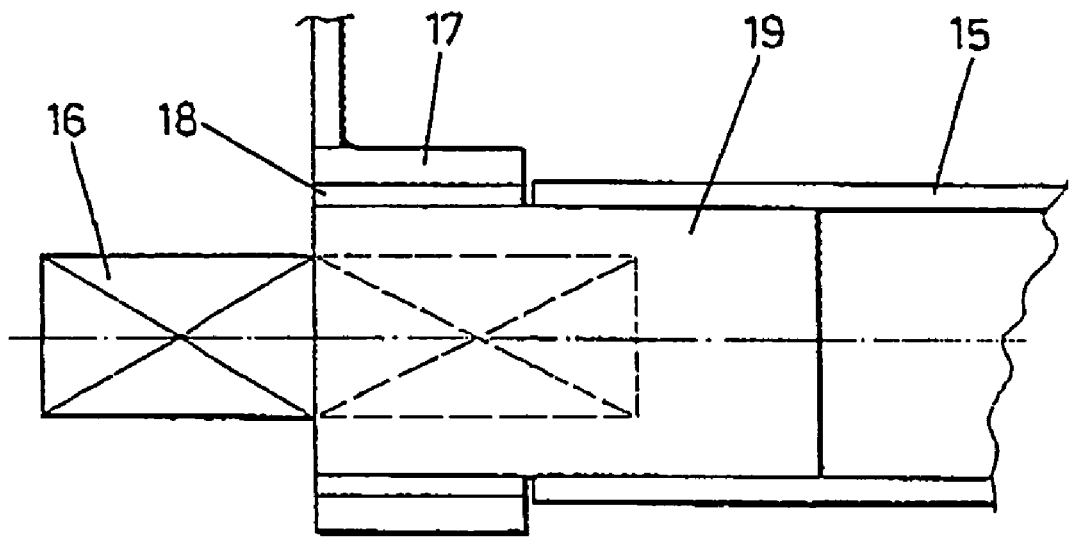

FIG. 4 shows a detail of the coupling between two sections or modules of the shaft of the screw.

Figure 5:
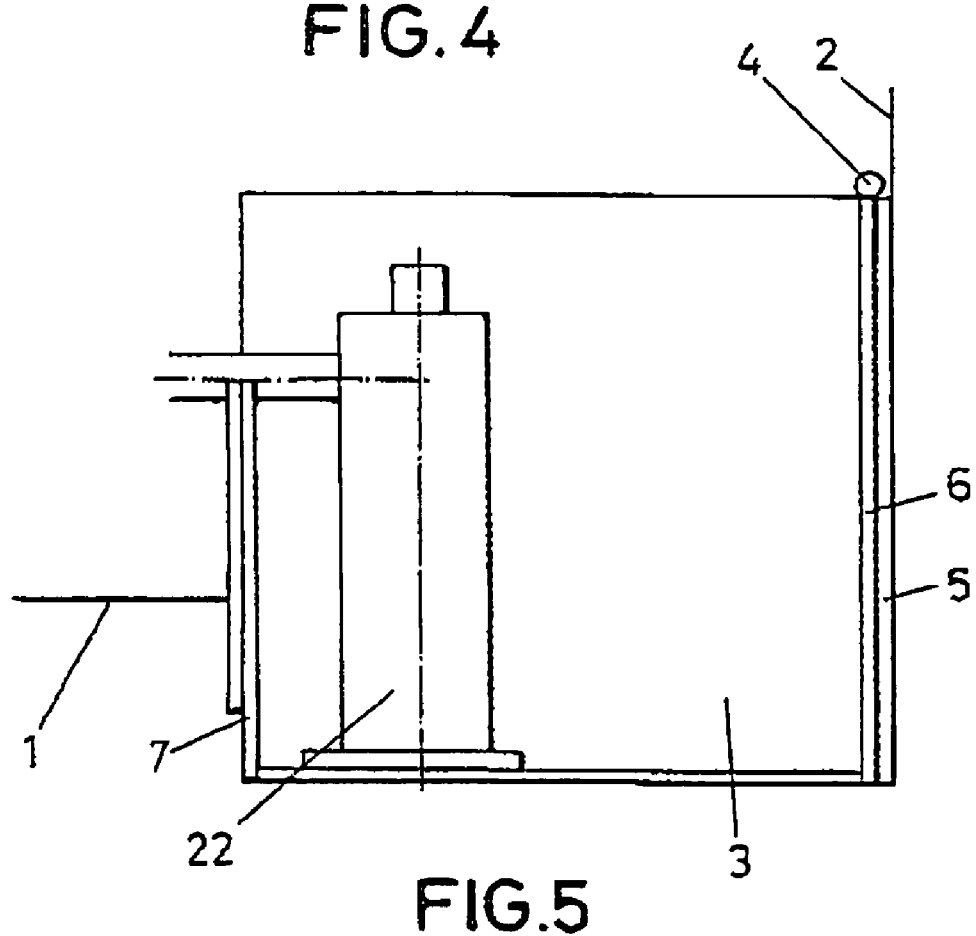

FIG. 5 shows an elevational sectional view of the inner end of the one of the arms, through which the arm is linked to the hull of the ship.

Figure 6:
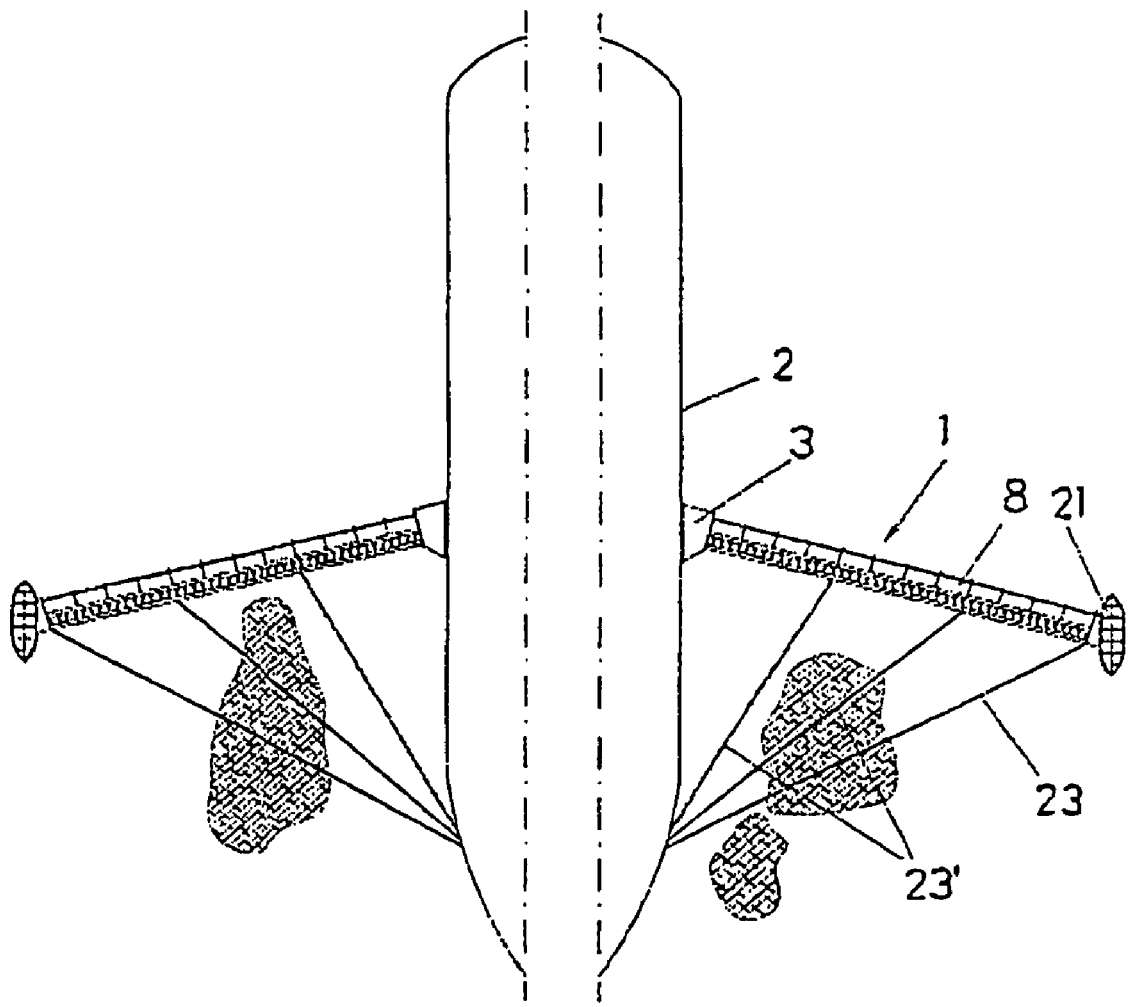

FIG. 6 shows a schematic representation similar to FIG. 1, wherein the hull of the ship has been fully represented and in which the arms of the device have been notably moved backwards, towards the mid area of said hull.

Figure 7:
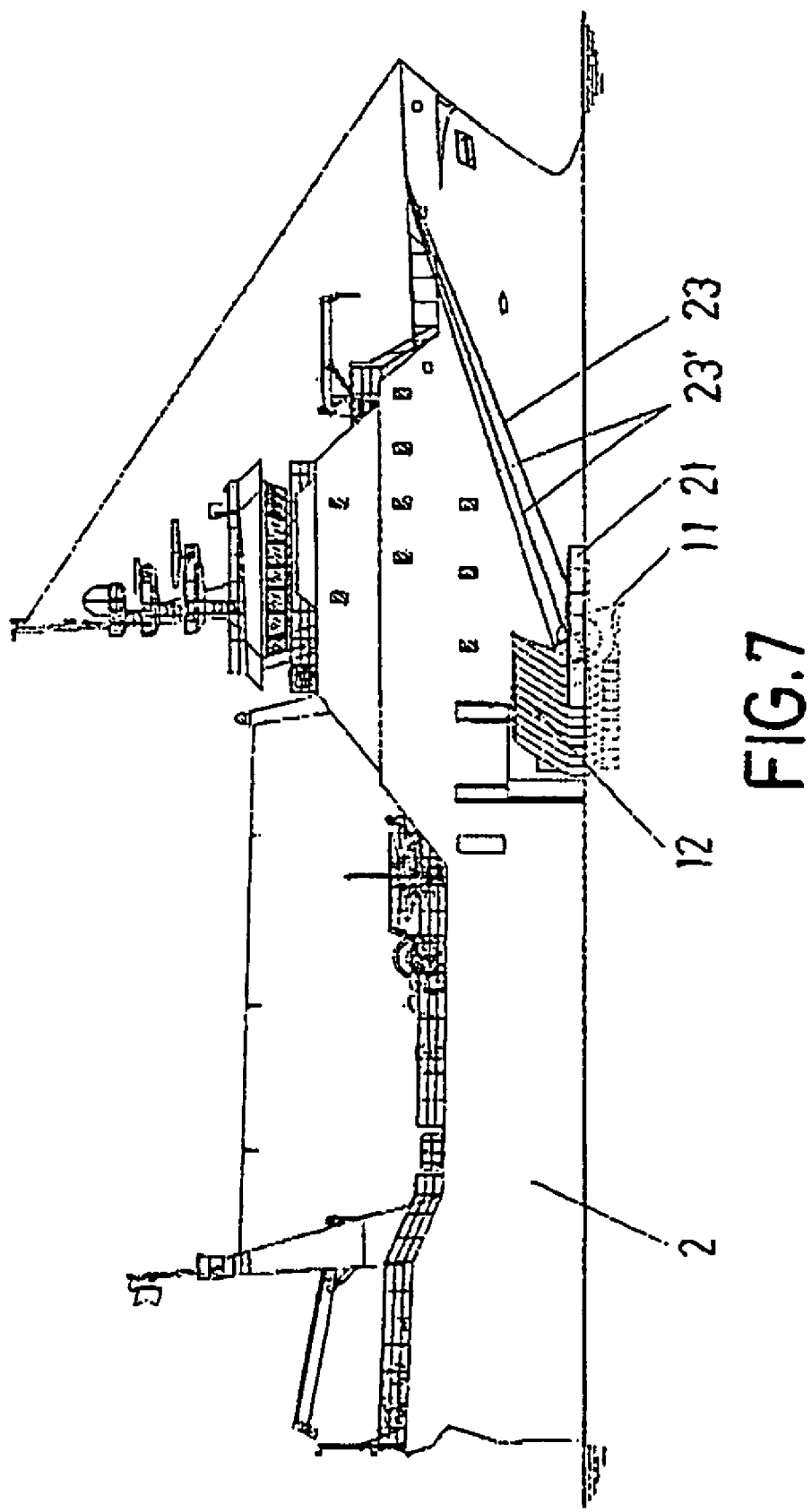

FIG. 7 shows a side elevational view of the assembly represented in the previous figure in which, as in the previous one, the device is in its working position.

Figure 8:
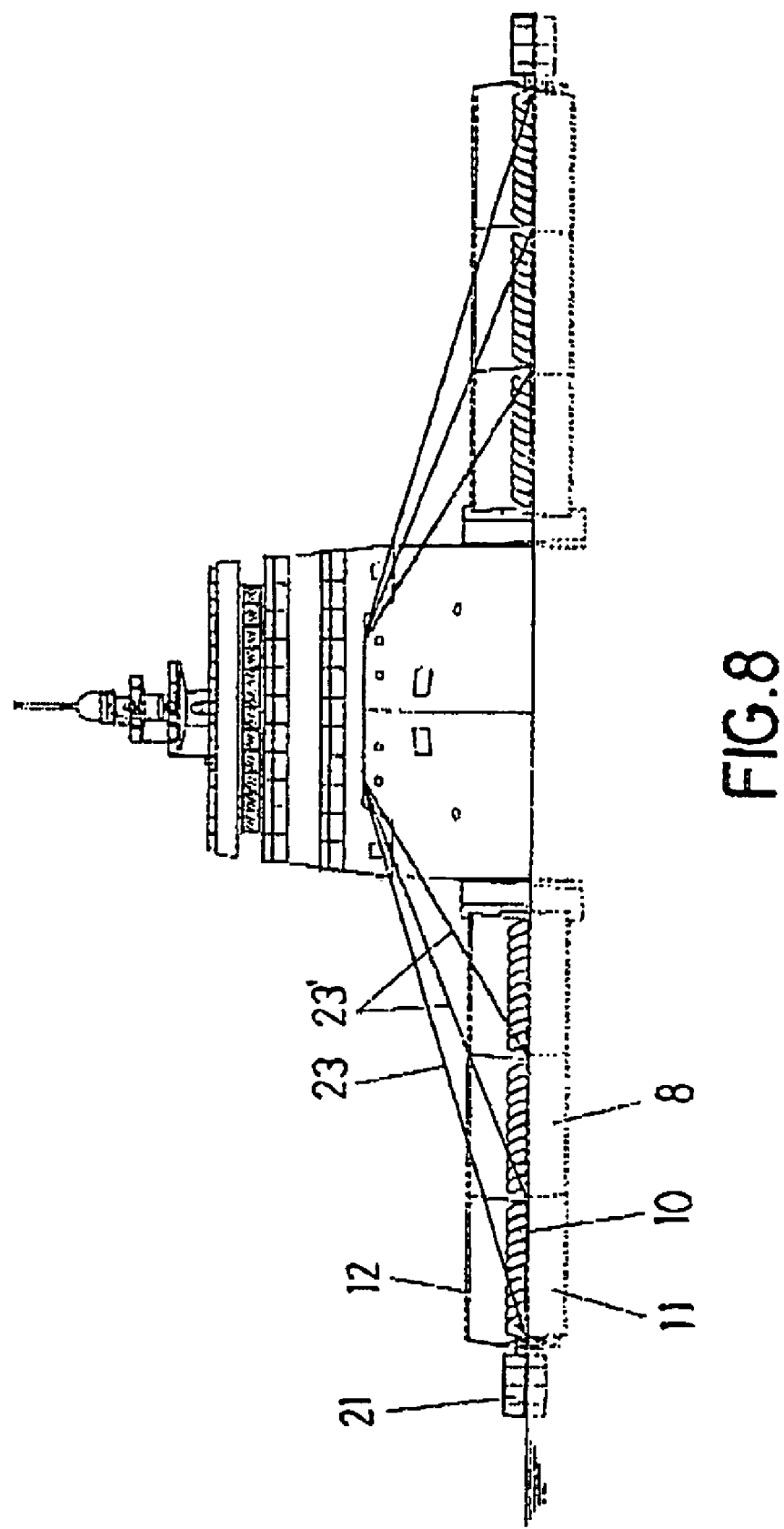

FIG. 8 shows a front elevational view of the same assembly of FIG. 7.

Figure 9:
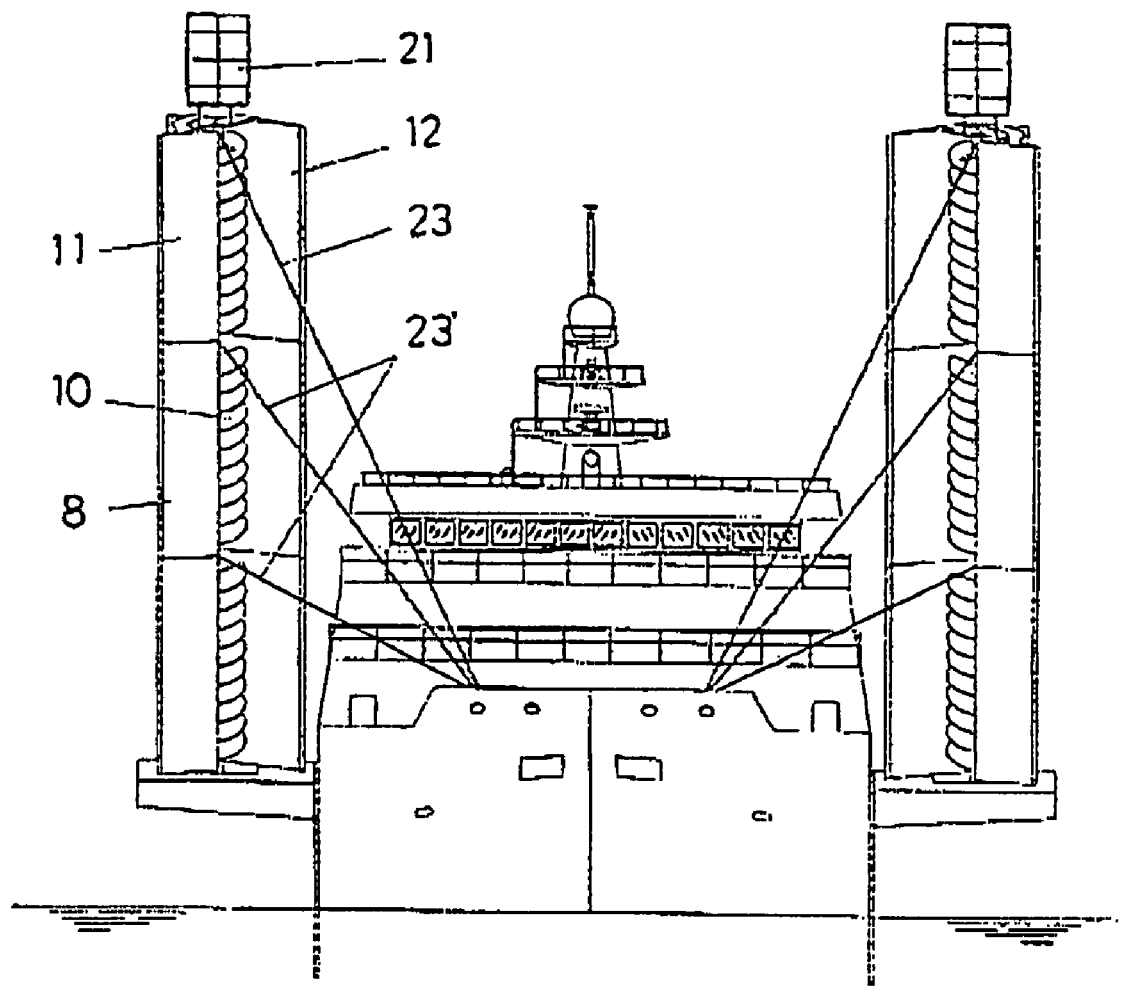

FIG. 9 shows a schematic representation similar to the one in FIG. 8, but in which the side arms are in the inoperative position.

Figure 10:
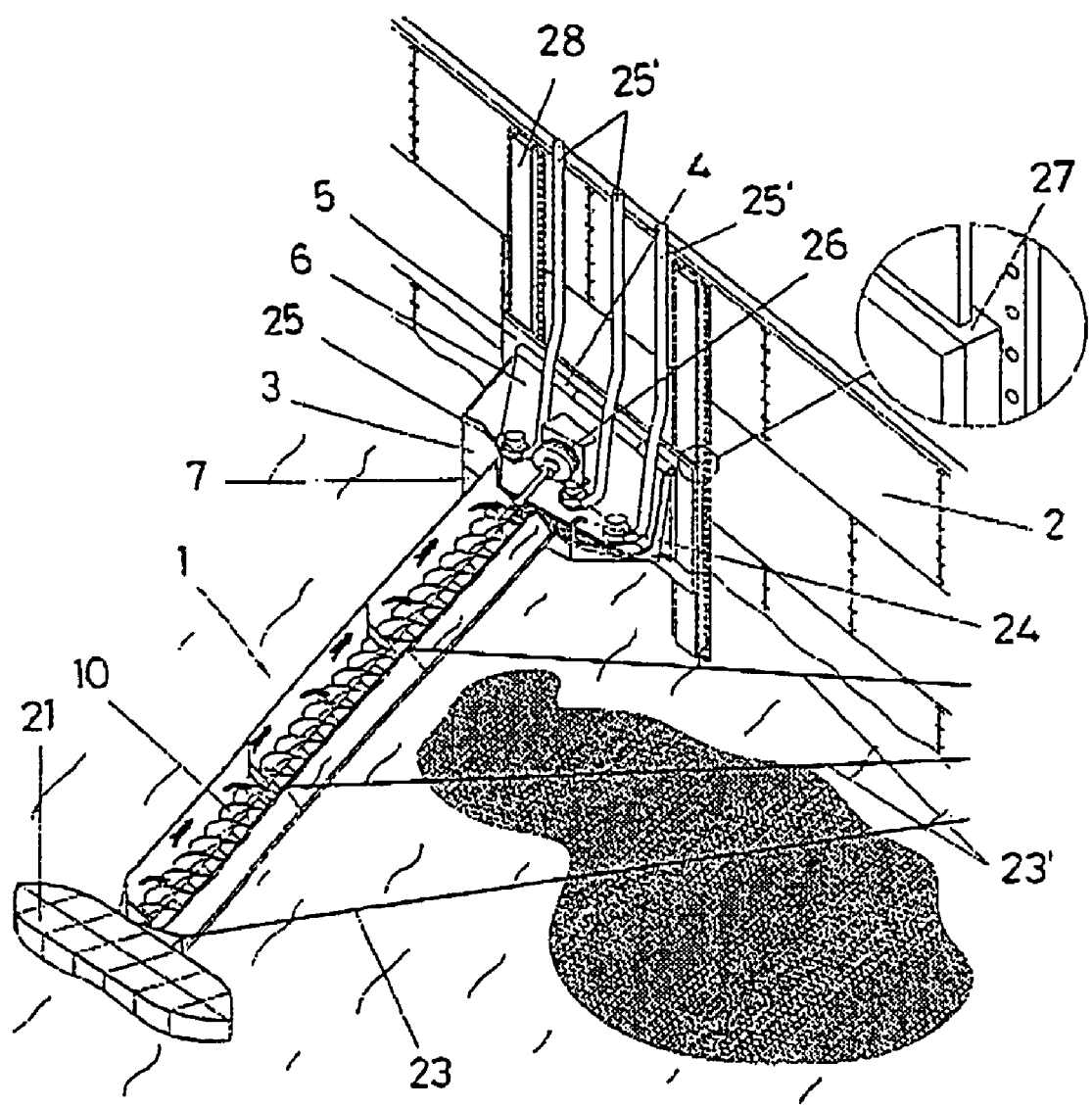

FIG. 10 finally shows a perspective view of a partial detail of the ship at the level of one of the arms of the device, where the structural features thereof can be seen with greater clarity, particularly the features of its collection tanks and the guides for displacing them.

DESCRIPTION OF THE PREFERRED EMBODIMENTS

In view of the figures discussed, it can be observed how the device of the invention is formed by means of a pair of arms (1-1') intended for being fixed to the sides of the hull (2) of a ship, either close to its bow, as in the example represented in FIG. 1, or preferably in the mid area of the hull, as in the example represented in FIG. 6, and in either case at the level of its waterline, specifically with the interposition of respective collection tanks (3) of a suitable capacity, such as in the order of 2.5 m$^3$, said tanks (3) being connected through a hinge (4) arranged at the level of its opening with a fixing plate (5) which is what links the tank (3) to the hull of the ship, for example by means of vertical guides, not shown in the drawings, allowing said tank (3) to maintain its correct position at all times with respect to the ship waterline, which varies according to ship load, for which purpose both the plate (5) and the corresponding inner side wall (6) of the tank (3) will have a top rectilinear edge so as to allow play of the pin of the hinge (4), while at the same time the side edges of the plate (5) must be parallel so as to allow its moving on also parallel and vertical guides integral with the hull (2) of the ship.

Integral with the substantially open outside wall (7) of the tank (3) is the rest of the arm (1), materialized in a casing which in turn has a semi-cylindrical configuration, based on a plurality of substantially planar and rectangular sheets (8) with their edges (9) bent inwardly, for mutual fixing by means of welding, creating a bottom semi-enclosure for a screw (10), as especially observed in FIG. 3, where the crude enters when it is floating with the aid of a front baffle (11) tilted upwards and backwards as shown in said FIG. 3, for the evident purpose of facilitating penetration of the crude towards the work area of the screw (10).

This polygonal profile for the casing based on the planar sheets (8) forming obtuse dihedrons, together with the radial partitions defined by its coupling edges (9), determines that when the crude penetrates inside said casing and becomes adapted to the surface thereof, a "tongue and groove" coupling effect is created that prevents the crude from moving around within the casing, very considerably favoring the functionality of the worm screw, specifically enhancing its performance.

The semi-enclosure formed by the sheets (8) is complemented with a top rear projection (12) of considerable height that is in turn tilted upwards and forwards, intended for constituting a containment surface preventing the crude from rising above the arm (1).

The sheets (8) forming the semi-enclosure and the front baffle (11) and the top projection (12) adopt a modular structure along the arm and are fixed together with the collaboration of a plurality of reinforcement brackets or ribs (13), also particularly visible in FIG. 3, that are located in correspondence with the imaginary junction planes between modules, and having bent pins (14) on their front edge to be fixed to the sheets (8), (11) and (12) by welding or by any other means.

The screw (10) also adopts a modular structure so as to facilitate manufacture and assembly, for which purpose the also modular shaft (15) thereof has a male part (16) on each of the ends of each module for tongue and groove coupling with the next module, and a complementary housing on the other end, as can be especially observed in FIG. 4, it having further been provided that in correspondence with the junction between modules of said screw (10), the corresponding brackets (13) incorporate an inner extension (17), extending to the level of said shaft and ending in a bushing (18) on which it may freely rotate.

The polygonal male part (16) and the complementary female housing will be arranged in respective gudgeons (19) that are duly integral with the also corresponding ends of the shaft (15) when the latter is hollow, as can also be observed in FIG. 4.

Arranged between each pair of reinforcement brackets (13) there is a float (20), the group of floats (20) corresponding to each arm being duly calculated so as to offset the weight thereof, such that permanent floating of the arm is defined by another float (21) arranged on the free end thereof.

It can also be pointed out that each float (20) has a length that coincides with the spacing between reinforcement brackets (13), in order to act as a connecting link between them and to enhance structural assembly stiffness.

The shaft of the screw receives movement from a motor preferably arranged on the ship, by means of a transmission mechanism (22) housed in the collection tank (3), where the crude suction pipe or pipes, not shown in the drawings, will also enter.

Arranged between the free end of each arm (1) and the bow of the ship (2) there is a tie or cable (23) which, without interfering in the upward/downward swiveling of the arm (1), appropriately braces said arm (1) against the stresses it is subjected to, due to the effect of the impact of the spill on the arm and the forward movement of the ship, as shown in FIG. 1. However, in the preferred case shown in FIGS. 6 and 7 in which the arms (1) are fixed to the hull (2) of the ship in the mid area thereof, the cables (23) could be fixed at any other point of the hull away from the bow, and furthermore other intermediate cables (23') evenly distributed along each arm may collaborate with said end cables (23), absorbing in a homogeneously distributed manner the stress to which said arm (1) is subjected in its forward movement in the water, preventing the buckling thereof which may negatively affect functionality of the complementary screw (10).

Coming back to the collection tank (3), it has two compartments differentiated by an intermediate partition (24) in which the pumps (25) for propelling the spills cleaned up by the screw (10) towards the inside of the ship through conduits (25') and for emptying the water that may have been carried to the collection tank (3), the motor (26) for operating the screw (10) also being located inside said collection tank.

Finally, each plate (5) to which both the collection tank (3) and the corresponding arm (1) are hingedly connected incorporates on its end side areas and on its side for being fixed to the hull (2), respective restricted opening grooves (27) of considerable width through which said plate (5) is coupled, with the ability to move vertically, to a pair of considerably spaced guides (28) that are integral with the hull (2) of the ship in a parallel and vertical arrangement, and provided with a mid longitudinal rib with a profile complementary with that of the grooves (27), such that this tongue and groove coupling between plate (5) and guides (28) and the special dimensional features thereof assure perfect vertical sliding of each collection tank (3) with its corresponding arm (1), adapting to the ship waterline, in the absence of pitching.

These guides (28) further allow suitably spacing each plate (5) from the ship so that despite the curvature of the latter, the plates (5) are rectilinear in order to allow swiveling of the collection tanks (3) and their corresponding arms (1) from the operative position shown in FIGS. 6, 7, 8, and 10, to the inoperative position shown in FIG. 9, which can be reached by means of pulling on the cables (23) or by any other means.

The invention claimed is:

1. A device for cleaning up oil spills attachable to a ship for cleaning up crude, the device comprising a pair of arms coupleable to a side of a hull of the ship at a water line level, each of said arms having a casing with a substantial semi-circular configuration, and an open top, and a front edge extending into a baffle positioned downwards and forwards to facilitate access to floating crude into said casing; a containment partition projecting upwardly and forwardly with a sufficient height to prevent the crude from rising above each of said arms; a screw housed in said casing and with its movement causing the crude to move; a collection tank arranged on an end of each of said arms and into which the crude is caused to move by said screw, said collection tank being connectable to the hull of the ship from where the crude is aspirated toward an inside of the ship.

2. A device as defined in claim 1, wherein said tank has a side wall provided for fitting to the ship and having a top free edge with a hinge for hingedly connecting said tank to a plate movable vertically by guides provided on the hull of the ship.

3. A device as defined in claim 1, wherein said casing includes a plurality of planar sheets with longitudinal edges bent for joining them together and defining a substantially semi-circumferential profile, said sheets, like said baffle and said container partition being modular along each of said arms and joined together with evenly distributed members selected from the group consisting of brackets and ties that are fixed to an outer side.

4. A device as defined in claim 3, wherein said screw is modular and has a shaft which shaft ends provided with means for axial and tongue and groove coupling between said portions at connection points, said brackets opposite said connection points between said portions of said shaft having a front extension ending in a sleeve in which said shaft acts.

5. A device as defined in claim 3, wherein each of said arms has a slightly forwardly inclined position so as to favor moving the crude toward the hull of the ship and is provided with a plurality of floats located between said brackets at a lower level and with another float located on its free end.

6. A device as defined in claim 1, further comprising means for coupling each of said arms to a corresponding side of the hull of the ship in a mid area and including at least one element selected from the group consisting of a tie and a cable guided from a free end of each of said arms to the hull and absorbing stresses to which said arm is subjected, wherein a plurality of intermediate cables are evenly distributed along each of said arms to cooperate with said cable.

7. A device as defined in claim 1, wherein each of said collection tanks has two compartments separated from one another by an intermediate partition, further comprising pumps for lifting collected wastes and pumps for emptying water carried to a respective one of said tanks, and a motor operating said screw of a respective one of said arms and located in said tank.

8. A device as defined in claim 1; and further comprising a plate on which each of said collection tanks and a corresponding one of said arms is assembled in a swiveling manner, each of said plates being provided with a restricted opening grooves which are complementary with guides integral with the hull of the ship, said grooves being configured to cooperate with front and longitudinal male projections provided on the hull of the ship.

* * * * *